United States Patent [19]
Ishii

[11] Patent Number: 5,724,615
[45] Date of Patent: Mar. 3, 1998

[54] COMMUNICATION CIRCUIT RECEIVING DATA SELECTABLY SYNCHRONIZED TO THE RISING OR FALLING EDGE OF A TIMING SIGNAL PROVIDED FROM THE DATA SOURCE

[75] Inventor: Kimiyasu Ishii, Kawasaki, Japan

[73] Assignee: Ricoh Company, Ltd., Tokyo, Japan

[21] Appl. No.: 444,874

[22] Filed: May 19, 1995

[30] Foreign Application Priority Data

Jun. 6, 1994 [JP] Japan .................................. 6-147071
Apr. 28, 1995 [JP] Japan .................................. 7-105757

[51] Int. Cl.$^6$ ............................................ G06F 13/42
[52] U.S. Cl. ........................... 395/881; 395/551; 395/559; 375/354
[58] Field of Search ....................... 395/200.2, 882, 395/878, 881, 880, 550, 551, 553, 558, 559; 307/409; 326/93, 94; 375/354

[56] References Cited

U.S. PATENT DOCUMENTS

| | | | |
|---|---|---|---|
| 4,407,014 | 9/1983 | Holtey et al. | 395/550 |
| 4,408,272 | 10/1983 | Valters | 395/550 |
| 4,782,499 | 11/1988 | Clendening | 375/358 |
| 4,881,165 | 11/1989 | Sager et al. | 395/550 |
| 4,984,194 | 1/1991 | Hoegberg | 375/354 |
| 5,115,455 | 5/1992 | Samaras et al. | 375/106 |
| 5,247,656 | 9/1993 | Kabuo et al. | 395/550 |
| 5,428,309 | 6/1995 | Yamauchi et la. | 327/158 |
| 5,479,129 | 12/1995 | Fernandez et al. | 327/276 |

FOREIGN PATENT DOCUMENTS

| | | |
|---|---|---|
| 0 042 976 | 1/1982 | European Pat. Off. . |
| 0 059 821 | 9/1982 | European Pat. Off. . |
| 38 26 266 | 3/1989 | Germany . |
| 296 562 | 12/1991 | Germany . |
| 2-19044 | 1/1990 | Japan . |
| 3-93333 | 4/1991 | Japan . |

*Primary Examiner*—Dinh C. Dung
*Attorney, Agent, or Firm*—Oblon, Spivak, McClelland, Maier & Neustadt, P.C.

[57] ABSTRACT

An integrated circuit has a central processing unit for performing predetermined processing, and a communication circuit for performing data communication between the central processing unit and the outside of the integrated circuit. The communication circuit includes a data receiving unit for receiving items of data from a received signal at a time according to a given timing signal. The communication circuit also includes a time differing unit for providing a different time at which the data receiving unit receives the plural items of data from the received signal. The communication circuit also includes a selecting unit for selecting whether the time differing unit is used or not used and another selecting unit for selecting whether the given timing signal is supplied from the outside of the integrated circuit or is supplied by an internal pulse generating circuit provided in the integrated circuit.

19 Claims, 10 Drawing Sheets

F I G. 1

FIG. 2A  SCK1
FIG. 2B  LD
FIG. 2C  INTERNAL STATE OF SHIFT REGISTER 4
FIG. 2D  TXD  TRANSFERRING DATA ($D_7 - D_0$)

FIG. 10 ic signal is delayed by the time differing means. Then,
the thus-delayed times are used for the data receiving means
such as a shift register to take the items of data from the
received data. As a result of such time delay, it is possible for
the data receiving means to receive each item of the plural

COMMUNICATION CIRCUIT RECEIVING DATA SELECTABLY SYNCHRONIZED TO THE RISING OR FALLING EDGE OF A TIMING SIGNAL PROVIDED FROM THE DATA SOURCE

BACKGROUND OF THE INVENTION

1. Field of the Invention

The present invention relates to a communication circuit for performing data transfer between CPUs such as microcomputers and between a CPU and an I/O (input/output) unit. The I/O unit, such as that including a shift register, is used for converting a signal in parallel data form into a signal in serial data form and vice versa. Such a communication circuit is suitable for use in an image forming apparatus such as a duplicator. The present invention in particular relates to a communication circuit included in an IC (integrated circuit) of such a CPU.

2. Description of the Related Art

Recently, an image forming apparatus such as a duplicator, has been provided with multiple functions. Thus, a CPU utilized as an IC of the image forming apparatus is demanded to control many functions. As a result, it is required to provide many wire harness units on the IC of the CPU. However, provision of many wire harness units in the IC of the CPU may degrade data processing performance of the CPU. For example, as a result of increasing the wire harness units of the IC of the CPU, the number of electrical wires connected to the IC of the CPU is increased and, thus, the area of a printed circuit board comprising the IC of the CPU is required to be increased. As a result, problems concerning electric noises occur.

In order to eliminate such problems, the IC of the CPU is divided into plurality of ICs of CPUs which are distributed to various appropriate locations in the apparatus. Data transfer between each of the ICs of the CPUs and a respective one of the I/O unit is performed as a serial data communication. The I/O unit is used between a CPU and terminal devices such as operation switches, display devices, and so forth for transferring specification data from the switches to the IC of the CPU and display data from the IC of the CPU to the display devices. As a result, it is possible to decrease the number of wire harness units to be provided in each of the ICs of the CPU.

In such an image forming apparatus, it is necessary to perform data transfer between the ICs of the CPUs and also between each IC of the CPU and a respective one of the I/O units. In order to achieve a high degree of accuracy in data transfer operations, it is required to simply perform such data transfer operations without using any special circuits inserted between the ICs of the CPUs and between each IC of the CPU and a relevant one of the I/O units.

However, in communication circuits for image forming apparatuses in the related art, in comparison to a case where data transfer is performed between ICs of the CPUs, there are many conditions to be fulfilled for enabling data transfer operations to be performed between an IC of a CPU and an I/O unit. In the alternative, it is necessary to insert a special circuit between an IC of a CPU and an I/O unit for enabling data transfer operations to be performed between an IC of a CPU and an I/O unit. For example, when data transfer is performed between ICs of CPUs using a serial clock signal SCK, data output from one IC of a CPU is performed at each decaying edge of clock pulses of the clock signal SCK while data input by the other IC of the CPU is performed at each rising edge of the clock pulses of the clock signal SCK.

Therefore, data output at a decaying edge of the clock pulses of the clock signal from the IC of the CPU is input by the other IC of the CPU at the subsequent rising edge of the clock pulses of the clock signal.

However, when data transfer is performed between an IC of a CPU and an I/O unit, some types of I/O units output data at each rising edge of the clock pulses of the serial clock signal SCK. Thus, in some cases, an I/O unit outputs data at each rising edge of the clock pulses of the serial clock signal SCK and an IC of a CPU inputs the data also at the rising edge of clock pulses of the serial clock signal SCK as mentioned above. It is difficult to ensure the data output at the edge of the clock pulses of the serial clock signal SCK by the I/O unit is input at precisely the same moment by the IC of the CPU. In fact, there may be a time delay due to electric current flowing in a circuit between the time the data is output from the I/O unit and the time the output data reaches the IC of the CPU. In order to ensure that data output by one component is input by another component, it is necessary to make the input time the receiving component inputs the data differ from the output time the sending component outputs the data.

In order to make the input timing differ from the output time when data is transferred between a I/O unit outputting data at each rising edge of the clock pulses and an IC of a CPU inputting the data at the rising edge of clock pulses, it is necessary to provide a special circuit so as to provide a finite time difference between the actual CPU-IC input timing and the actual I/O-unit output timing.

Instead of providing such a special circuit, it is possible to perform data transfer without using I/O units. That is, data transfer between an IC of a CPU and terminal devices such as operation switches, display devices, and so forth for transferring specification data from the switches to the IC of the CPU and display data from the IC of the CPU to the display devices is performed using signals in parallel data form. However, if data transfer is performed in the parallel data form, many wire harness units are required to be provided and, thus, accuracy in data transfer operations may be degraded. Alternatively, it is also possible to draw out a data bus from an IC of a CPU. The data bus is then connected to an I/O expander for converting a signal in parallel data form to a signal in a serial form. However, in this method, it is likely that electric noise may be introduced into the data bus.

SUMMARY OF THE INVENTION

An object of the present invention is to provide a communication circuit in an IC of a CPU for enabling data transfer operations to be simply performed without use of any special circuits inserted between the ICs of the CPUs and between the IC of the CPU and a relevant one of the I/O units. Thus, a high degree of accuracy can be achieved in the data transfer operations.

In order to achieve this object of the present invention, the communication circuit includes time differing means for providing a different time at which data receiving means receives a plurality of items of data from a received signal from a timing according to a given timing signal. As a result, if the items of data are transferred from an I/O unit at times according to the given timing signal, times of the given timing signal is delayed by the time differing means. Then, the thus-delayed times are used for the data receiving means such as a shift register to take the items of data from the received data. As a result of such time delay, it is possible for the data receiving means to receive each item of the plural items of data from the received signal after the item of data carried by received signal has reached the data taking means.

The received signal carries the plural items of data in a manner in which the plural items of data are successively carried and each item of the plural items of data is maintained for a predetermined time period. Therefore, as long as the time period for which the time differing means delays the data receiving time is within the predetermined time period for which each item of data is maintained, the data receiving means receives the item of data from the received data.

Specifically, the given timing signal comprises a clock signal comprising serial clock pulses. The above-mentioned predetermined time period for which each item of the plural item of data is maintained is a time between two adjacent same sort of edges of the serial clock pulses. The same sort of edges are either rising edges or decaying edges. The data receiving means receives each item of the plural items of data from the received signal at a same sort of edge, that is, either a rising edge or a decaying edge of the serial clock pulses. The time differing means comprises an inverter for inverting between a high level and a low level of the clock signal. As a result of inverting the clock signal, a time for each rising edge and a time for each decaying edge are inverted with each other in the clock signal. Thus, the time at which the data receiving means receives an item of data from the received signal is delayed to the subsequent edge of the serial clock pulses.

Specifically, if the I/O unit transfers the plural items of data at each rising edge of the serial clock pulses, each item of the plural items of data is maintained for the predetermined time period between two adjacent rising edges of the serial clock pulses. As a result of the inverter inverting the given timing signal, the time of each rising edge of delayed serial clock pulses resulting from inverting the original serial clock pulse is a time of each decaying edge of the original serial clock pulses. That is, the time of each rising edge of the delayed serial clock pulse resulting from inverting the original serial clock pulse is substantially delayed from a time of each rising edge of the original serial clock pulses for a time period between a rising edge and the subsequent decaying edge in the original serial clock pulses. The data receiving means then receives data at each rising edge of the delayed serial clock pulses. Because a rising edge of the delayed serial clock pulses is present at the middle between each two adjacent rising edges of the original serial clock pulses, the data receiving means receives each item of the data from the receiving signal at the middle of the predetermined time period for which the item of data is maintained.

Alternatively, the time differing means may comprise signal delaying means for delaying, for a predetermined delay time, the receiving signal. The predetermined time period comprises a time period between a rising edge and the subsequent decaying edge of the serial clock pulses or between a decaying edge and the subsequent rising edge of the serial clock pulses. That is, the time differing means delays the receiving signal, for a time period between either a rising edge and the subsequent decaying edge or a decaying edge and the subsequent rising edge of the serial clock pulses.

Therefore, if the I/O unit transfers the plural items of data at each edge of the same kind of edges, that is, either each rising edge or each decaying edge of the serial clock pulses, each item of the plural items of data is maintained for the predetermined time period between adjacent two edges of the same kind of edges of the serial clock pulses. The signal carrying the plural items of data is then delayed by the time differing means for the time period between two adjacent edges of the serial clock pulses. Every two adjacent edges of the serial clock pulses are different kinds of edges, that is, a rising edge and a decaying edge. As a result, although the data receiving means receives data at each edge of the above-mentioned same kind of edges of the serial clock pulses, after the time differing means delaying the received signal, the data receiving means receives each item of the data from the receiving signal at the middle of the predetermined time period for which the item of data is maintained.

That is, if the I/O unit transfers the plural items of data at each rising edge of the serial 10 clock pulses, each item of the plural items of data is maintained for the predetermined time period between two adjacent rising edges of the serial clock pulses. The signal carrying the plural items of data is then delayed by the time differing means for the time period between two adjacent edges of the serial clock pulses. As a result, each item of the plural items of data is maintained for the predetermined time period between two adjacent decaying edges of the serial clock pulses. The data receiving means then receives data at each rising edge of the serial clock pulses. Because a rising edge is present at the middle between each two adjacent decaying edges, the data receiving means receives each item of the data from the receiving signal at the middle of the predetermined time period for which the item of data is maintained.

The communication circuit may comprises data putting means for putting a plural items of data onto a transmitting signal at a time according to either the given timing signal or another given timing signal. Thereby, it is possible to transferring data in addition to receiving data.

Further, the communication circuit may further comprise selecting means for selecting whether the time differing means is used or not used. If data communication is performed between ICs including CPUs, a time at which each item of data is transferred from one IC and a time at which the same item of data is received by the other IC is different from each other. Therefore, it is necessary to use such time differing means.

Another aspect of the present invention is an integrated circuit comprising:

a central processing unit for performing predetermined processing;

a communication circuit for performing data communication between the central processing unit and externally of the integrated circuit;

the communication circuit comprising:

data receiving means for receiving a plural items of data from a received signal at a timing according to a given timing signal; and time differing means for providing a different time at which the data receiving means receives the plural items of data from the received signal from the timing according to the given timing signal.

By providing the time differing means in the integrated circuit, it is not necessary to insert any special circuit between the integrated circuit and the I/O unit in order to perform data communication therebetween.

The communication circuit may further comprise selecting means for selecting whether the time differing means is used or not used and other selecting means for selecting whether the given timing signal is supplied from externally of the integrated circuit or is supplied by an internal pulse generating circuit provided in the integrated circuit.

Thereby, if data is transferred between two similar integrated circuits, as mentioned above, a time at which each item of data is transferred from one IC and a timing at which the same item of data is received by the other IC are different from each other.

Further, it is selected in a first integrated circuit that the given timing signal is supplied by the internal pulse generating circuit provided therein and it is selected in the second integrated circuit that the given timing signal is supplied from externally thereof. Accordingly, the same given timing signal is used in the two integrated circuit as a result of the first integrated circuit supplying the given signal to the second integrated circuit.

Other objects and further features of the present invention will become more apparent from the following detailed description when read in conjunction with the accompanying drawings.

DESCRIPTION OF PREFERRED EMBODIMENTS

With reference to FIGS. 1, 2, 3, 4 and 5, a communication circuit in a first embodiment of the present invention will now be described. The communication circuit in the first embodiment of the present invention is included in an IC 100 in a CPU. The CPU is, for example, used for controlling data processing in an image forming apparatus such as a duplicator in a well-known manner. The communication circuit includes a shift register 4 of the parallel-in and serial-out type which is connected to an internal data bus 1 of the CPU. A data loading signal LD for data transmission and a serial clock signal SCK1 are input to the shift register 4. The serial clock signal SCK1 is generated by a pulse generating circuit (not shown in the figure) in response to transmission instructions output by the CPU in the IC 100. A flip-flop 5 is also included in the communication circuit and is connected to a Q terminal of the shift register 4 as shown in the figure. The flip-flop 5 outputs a serial transmission signal TXD in serial data form via a Q terminal thereof.

Figure 1:
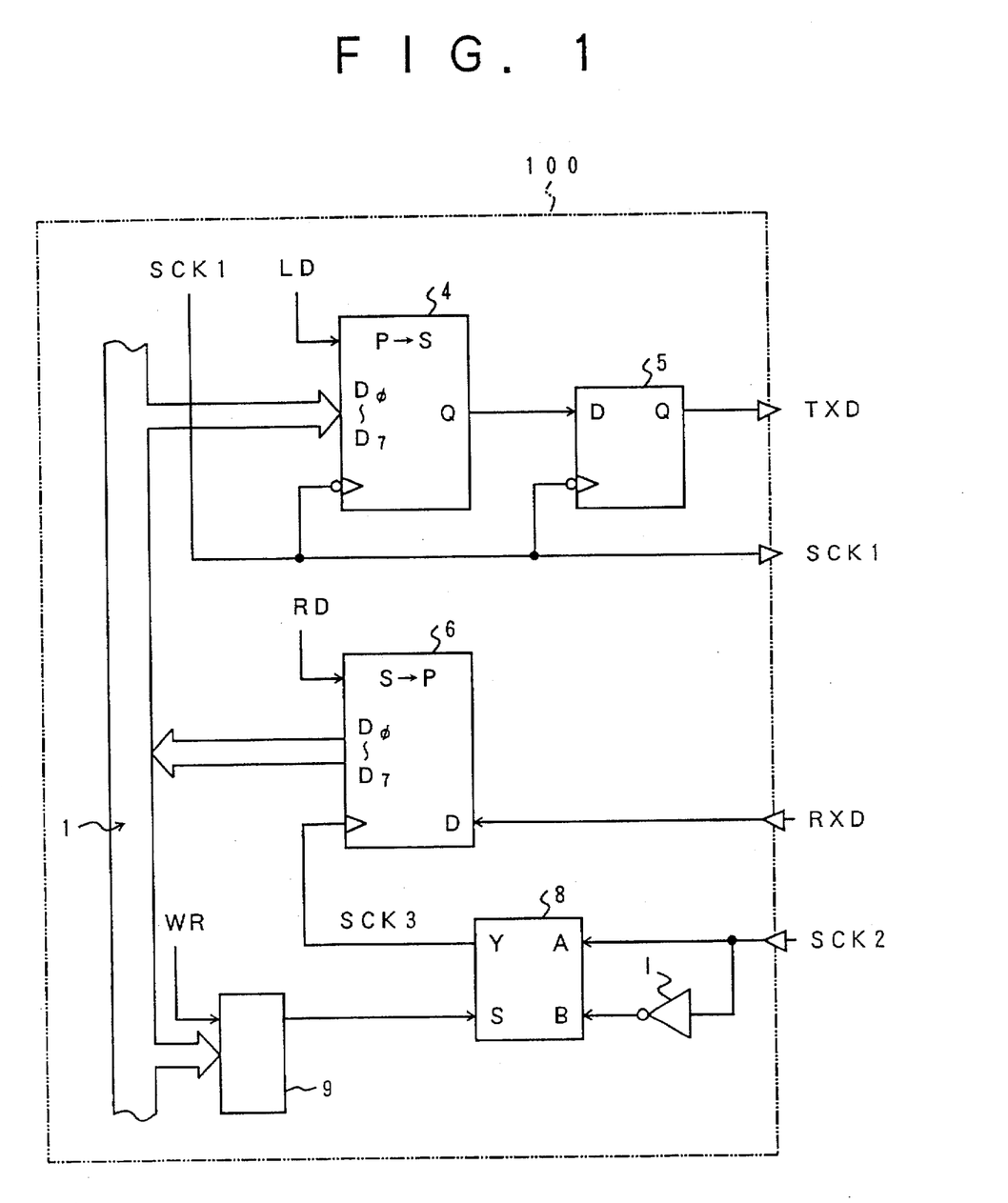
FIG. 1 shows a partial circuit diagram of an IC including a communication circuit in a first embodiment of the present invention.

Further, the communication circuit includes a shift register 6 of the parallel-in and serial-out type and is connected to the above-mentioned internal data bus 1 of the CPU. A serial reception signal in serial data form RXD and a serial clock signal SCK3 are input to the shift register 6. The serial clock signal SCK3 is selectively output by a data selector 8 included in the communication circuit. A serial clock signal SCK2 and an inverted clock signal are input to the data selector 8. The inverted clock signal is obtained by inverting the signal SCK2 through an inverter I. The data selector 8 selects an appropriate one of the serial clock signal SCK2 and the inverted clock signal. The signal is output as the serial clock SCK3 from the data selector 8.

An output terminal of a setting register 9 is connected to an S terminal of the data selector 8. The setting register 9 is connected to the abovementioned data bus 1. A writing signal WR is also input to the setting register 9. The writing signal WR is a control signal. Data present in the internal data bus 1 is written in the setting register 9 under control of the writing signal WR.

Figure 2A:
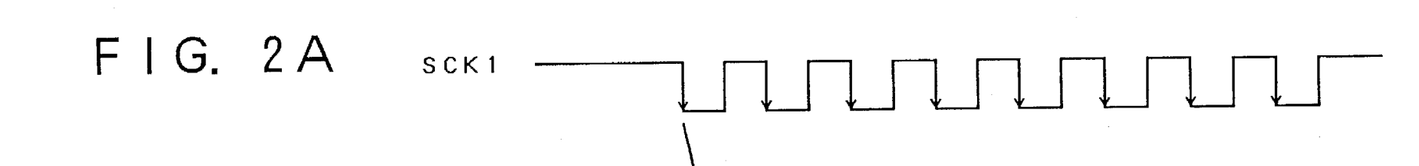
FIGS. 2A, 2B and 2D show how time charts of a data transferring operation of the communication circuit shown in FIG.1.
Figure 2B:
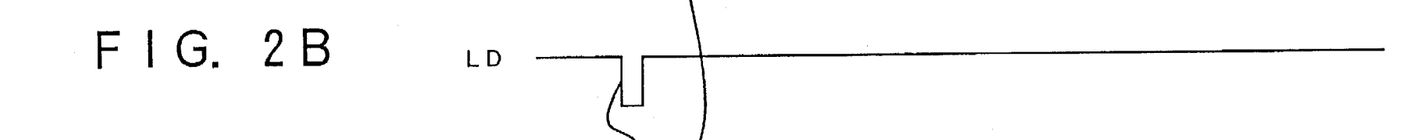
Figures 2C, 2D:
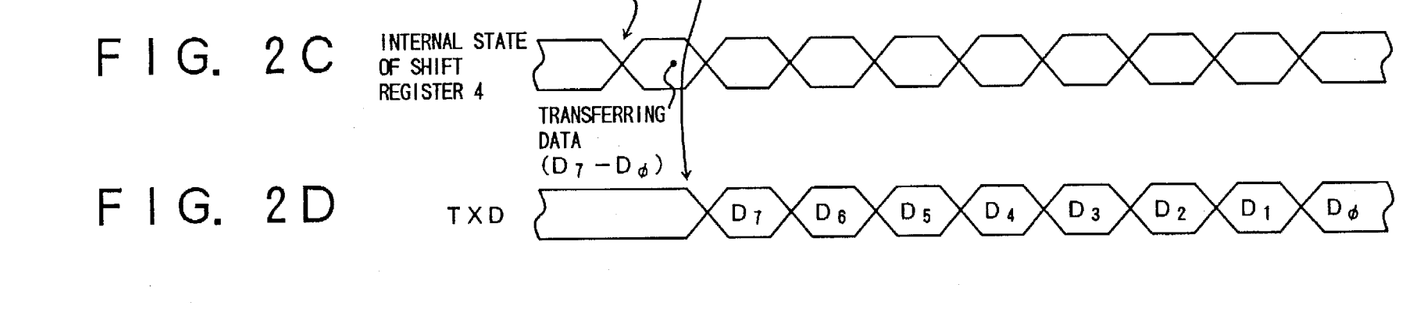
FIG. 2C shows the state of a shift register in the communication circuit shown in FIG. 1.

With reference to FIGS. 2A, 2B, 2C and 2D, a data transmission operation of the above-described communication circuit will now be described. The data being transferred from the CPU 1 in the IC 100 to another CPU or an I/O unit, the CPU in the IC 100 supplies data $D_7$, $D_6$, $D_5$, $D_4$, $D_3$, $D_2$, $D_1$ and $D_\phi$ (hereinafter referred to data $D_7$–$D_\phi$), to be transferred. A control unit in the CPU of the IC 100 supplies the above-mentioned data loading signal LD to the shift register 4 prior to the generation of the serial clock signal SCK1 as shown in FIGS. 2A and 2B. As a result of the data loading signal LD being input to the shift register 4, the data $D_7$–$D_\phi$ is loaded in the shift register 4 as shown in FIG. 2C through the internal data bus 1 by the CPU. Then, 8 data bits of the data $D_7$–$D_\phi$ thus-loaded in the shift register 4 are shifted at each decaying edge of the clock pulses of the serial clock signal SCK1. As the 8 data bits are shifted, the most significant bit (MSB) of the data $D_7$–$D_\phi$ is successively output via the Q terminal of the shift register 4. The flip-flop 5 takes the thus-output data bit, via the D terminal, at the decaying edge of the clock pulses, and outputs the data bit, via the Q terminal, as the transmission signal TXD shown in FIG. 2D.

With reference to FIGS. 3A, 3B, 3C, 3D and 3E, a data reception operation of the communication circuit will now be described in which data transferred from another CPU or an I/O unit is received by the CPU in the IC 100. When an "H" level signal (shown in the left half of FIG. 3B) is input via the S terminal to the data selector 8, the data selector 8 outputs, via the Y terminal, the serial clock signal SCK3 (shown in the left half of FIG. 3C) which is the serial clock signal SCK2 (shown in FIG. 3A) input via an A terminal.

Figure 3A:
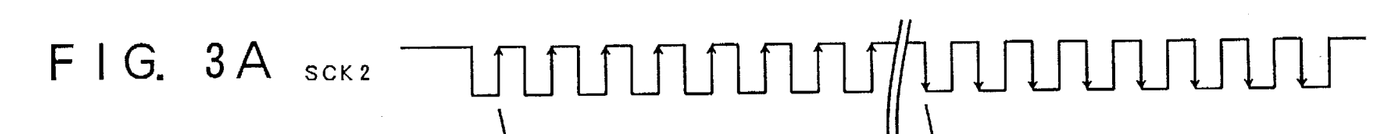
FIGS. 3A, 3B, 3C and 3D show time charts of a data receiving operation of the communication circuit shown in FIG. 1.
Figure 3B:
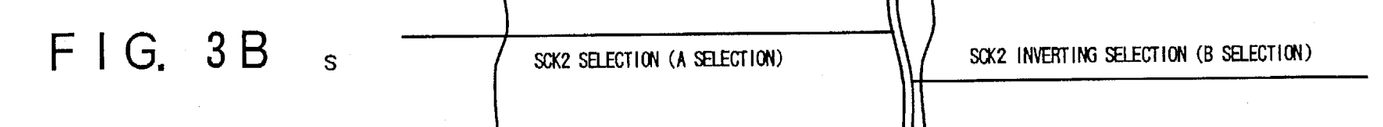
Figure 3C:
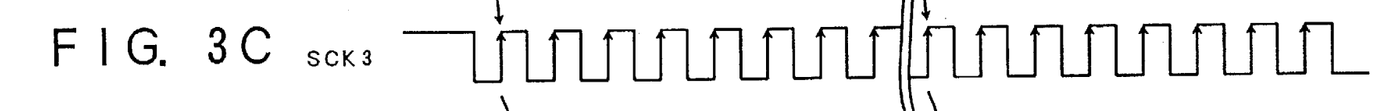
Figure 3D:
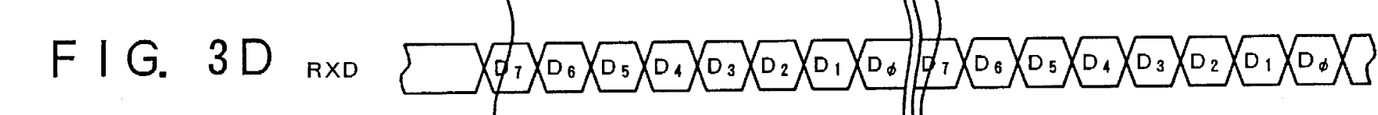
Figure 3E:
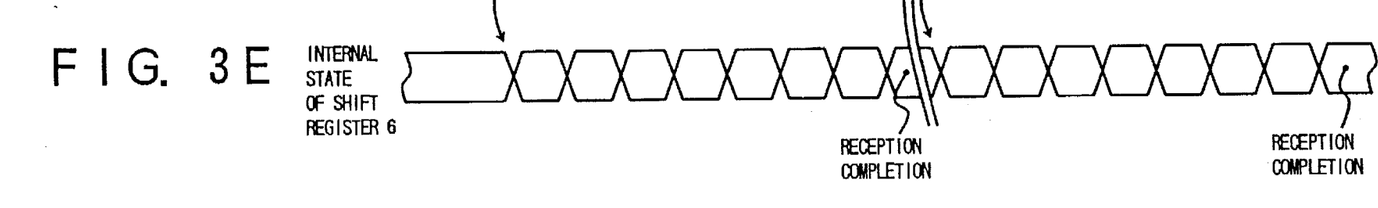
FIG. 3E shows the state of a shift register 6 in the communication circuit shown in FIG. 1.

When an "L" level signal (shown in the right half of FIG. 3B) is input via the S terminal to the data selector 8, the data selector 8 outputs, via the Y terminal, the clock signal SCK3 (shown in the right half of FIG. 3C) which is the inverted signal of the serial clock signal SCK2 input via a B terminal. Whether the "H" level signal or "L" level signal is supplied to the S terminal of the data selector 8 is determined by the setting register 9 based on data written in the setting register under control of the writing signal WR. The serial reception signal RXD carrying data $D_7-D_0$ (shown in FIG. 3D) is successively input to the shift register 6 and shifted therein in synchronization with each rising edge of the clock pulses of the serial clock signal SCK3. Thus, as a result of 8 successive clock pulses of the serial clock signal SCK3 being input to the shift register 6, 8 data bits representing the reception data $D_7-D_0$ are taken and stored in the shift register 6 as shown in FIG. 3E. Thus, when the serial clock signal SCK2 is selected by the data selector 8, the data $D_7-D_0$ of the RXD signal is received by the shift register 6 at each rising edge of the clock pulses of the serial clock signal SCK2 as shown in the left half of FIGS. 3A, 3B, 3C, 3D and 3E. When the inverted clock signal of the serial clock signal SCK2 is selected by the data selector 8, the data $D_7-D_0$ of the RXD signal is received by the shift register 6 at each decaying edge of the clock pulses of the serial clock signal SCK2 as shown in the right half of FIGS. 3A, 3B, 3C, 3D and 3E. Whether a rising edge or a decaying edge of the clock pulses of the serial clock signal SCK2 is used to input the data of the reception signal is determined by the signal input to the S terminal of the data selector 8, which signal is supplied by the setting register 9 based on data written in the setting register 9 under control of the writing signal WR.

Then, the CPU in the IC 100 outputs data reading instructions and, thus, supplies a data reading signal RD to the shift register 6. As a result, the 8 items of reception data $D_7-D_0$ stored in the shift register 6 is read by the CPU through the internal data bus 1 in parallel data form.

Further, in the communication circuit in the first embodiment of the present invention, not shown in the figure, means for passing an interrupt signal are provided. When the interrupt signal indicating completion of transferring of the 8 data bits is passed to the CPU, the CPU reads reception data and loads data to be subsequently transferred. Further, a flag register is provided for monitoring whether or not data is being transferred.

Further, the operation of transferring data is started after the loading of data in the shift register 4 is finished. However, by providing another register between the internal data bus 1 and the shift register 4, it is possible for the CPU to independently perform the operation of loading data through the internal data bus 1 and an actual data transfer operation. That is, even while data is being loaded through the internal data bus 1 in the other register, data previously loaded in the shift register 4 can be transferred.

Similarly, by providing another register between the shift register 6 and internal data bus 1, it is possible for the CPU to independently perform an operation of reading data through the internal data bus 1 and an actual data reception operation. That is, even while data is being received by the shift register 6, data previously received and stored in the other register can be read through the internal data bus 1.

Figure 4:
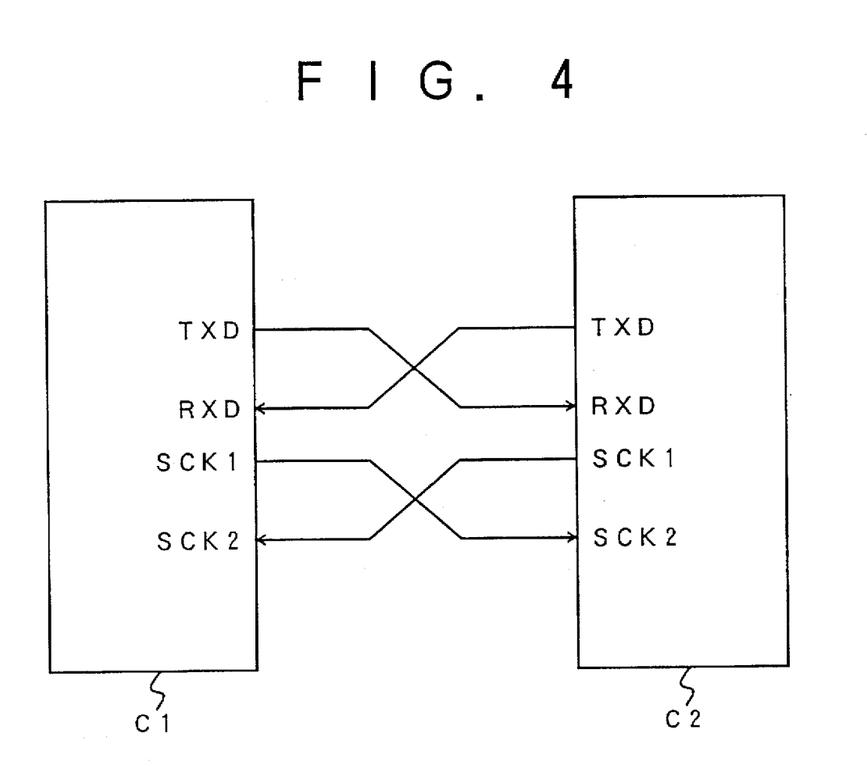
FIG. 4 shows a wire connection between two ICs, each of which may be an IC including the communication circuit in any one of the first and a second embodiments of the present invention.

With reference to FIG. 4, an arrangement is provided in which data is transferred between two ICs C1 and C2, each being the same as the IC 100 described above and having the CPU and the communication circuit of the first embodiment of the present invention. When data is transferred between the two ICs C1 and C2, the serial transmission signal TXD, transferred from the IC C1, is the serial reception signal RXD received by the IC C2. Similarly, the serial transmission signal TXD transferred from the IC C2 is the serial reception signal RXD received by the IC C1. The serial clock signal SCK1 of the IC C1 is the serial clock signal SCK2 received by the IC C2. Similarly, the serial clock signal SCK1 of the IC C2 is the serial clock signal SCK2 received by the IC C1.

In such a case, the CPU in each of the ICs C1 and C2 may determine, by appropriately giving the writing signal WR to the setting register 9 and thus writing appropriate data in the setting register 9, that the data selector 8 selects the SCK2 via the A terminal. Thus, the reception data RXD is received by the shift register 6 at each rising edge of the clock pulses of the serial clock signal SCK2 in a first IC of C1 and C2, as shown in the left half of FIGS. 3A, 3B, 3C, 3D and 3E. The same data is transferred from the flip-flop 5 at each decaying edge of the clock pulses of the same serial clock signal in the second IC, as shown in FIGS. 2A, 2B, 2C and 2D. Thus, the time the shift register 6 receives data in the first IC is different, by a pulse span of the serial clock signal, from the time the flip-flop 5 transfers the same data in the second IC.

Figure 5:
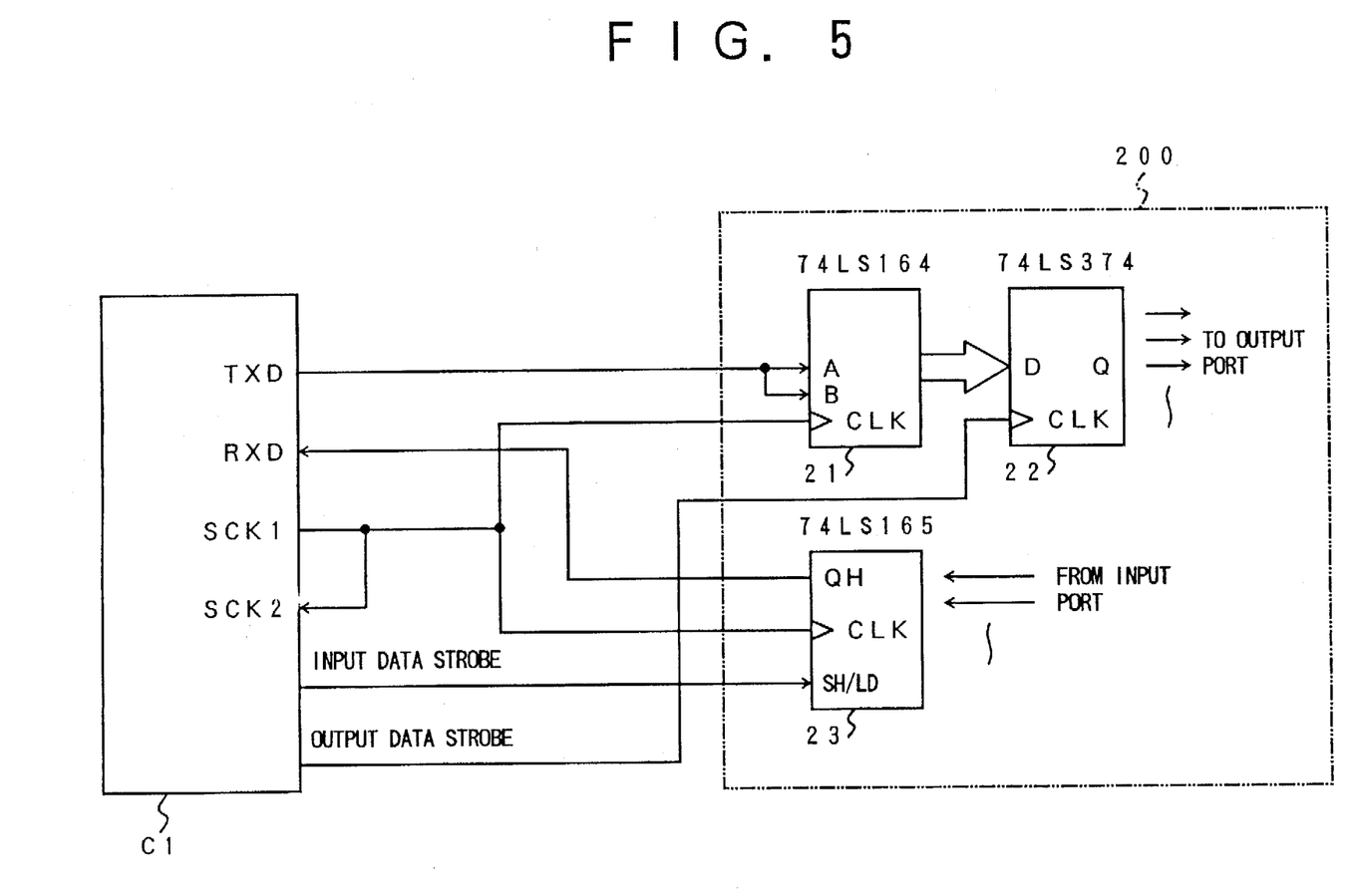
FIG. 5 shows a circuit diagram of an I/O unit in the related art and shows a wire connection between the I/O unit and an IC, which includes the communication circuit in any one of the first and second embodiments of the present invention.

With reference to FIG. 5, a description will now be given in which data is transferred between one IC C1 and an I/O unit 200. The IC C1 is the same as the IC 100 described above in the first embodiment of the present invention. The I/O unit 200 includes shift registers 21, 22 and 23 as shown in the figure. The shift registers 21, 22 and 23 may be of the type SN74LS164, SN74LS374, and SN74LS165 manufactured by Texas Instruments Inc.

The I/O unit 200 receives input data from terminal devices such as operation switches and so forth via input ports in parallel data form. Then, the shift register 23 converts the input data from the parallel data form to input data in serial data form which is then transferred to the CPU in the IC C1. The CPU in the IC C1 transfers output data in serial data form to the shift register 21 in the I/O unit 200. The shift registers 21 and 22 convert the output data from the serial data form into output data in parallel data form which is then supplied to terminal devices such as display devices and so forth via output ports.

In such a case, the serial clock signal SCK1 is also used as the serial clock signal SCK2 as show in the figure. Then, the CPU in IC C1 may determine, by giving the writing signal WR to the setting register 9 and thus writing data in the setting register 9, that the data selector 8 selects the above-mentioned inverted clock signal of the serial clock signal SCK2 input thereto via the B terminal thereof. Thus, the reception data RXD is received by the shift register 6 at each decaying edge of the clock pulses of the serial clock signal SCK2 in the IC C1, as shown in the right half of FIGS. 3A, 3B, 3C, 3D and 3E while the same data is transferred from the shift register 23 at each rising edge of the clock pulses of the same serial clock signal in the I/O unit 200. Thus, the time the shift register 6 takes data in the IC C1 is different, by a pulse span of the serial clock signal from the time the shift register 23 transfers the same data in the I/O unit 200. As a result, the data can be transferred without using any 10 special circuits between the IC C1 and the I/O unit 200.

In the above-described IC 100, setting data is written into the setting register 9 under control of the writing signal WR. This determines whether the "H" level signal or the "L" level signal is output depending on the software programs according to which the CPU operates, the software programs and changes to them being well-known in the field of communication data transfer. Therefore, it is very easy for a user to select one of two operation modes. A first operation mode is selected when the IC 100 performs data communication with an I/O unit such as the above-mentioned I/O unit 200 as shown in FIG. 5. In order to select the first operation mode, the user is required to merely change an appropriate part of the software programs. As a result, the communication circuit is automatically set so that the inverter I is used in response to the CPU writing appropriate setting data into the setting register 9.

A second operation mode is selected when the IC 100 performs data communication with a similar IC as shown in FIG. 4. In order to select the second operation mode, the user is required to merely change an appropriate part of the software programs. As a result, the communication circuit is automatically set so that the inverter I is not used in response to the CPU writing appropriate setting data into the setting register 9.

Figure 6:
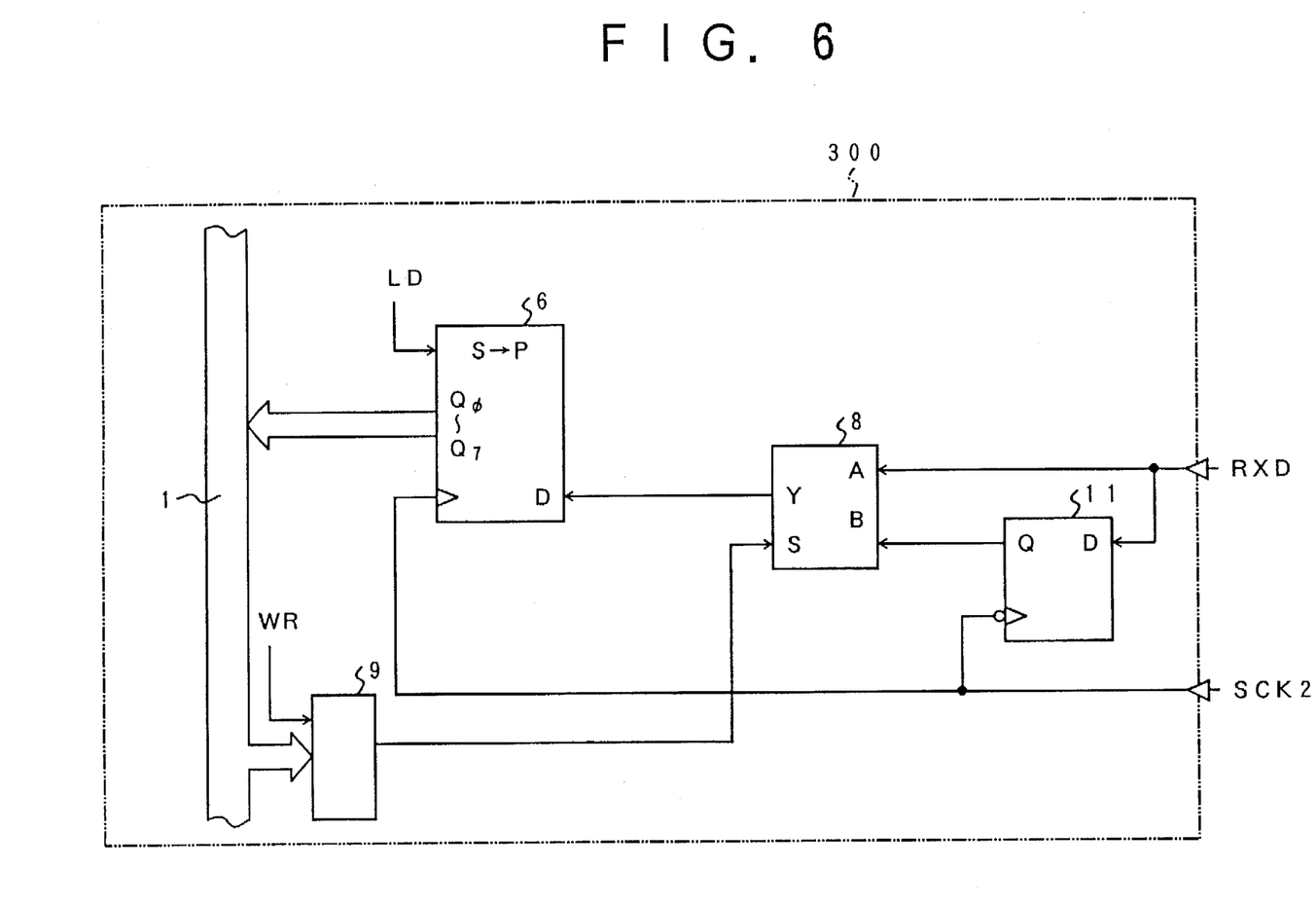
FIG. 6 shows a partial circuit diagram of an IC including a communication circuit in the second embodiment of the present invention.

A communication circuit in a second embodiment of the present invention will now be described with reference to FIG. 6. The communication circuit in the second embodiment is included in an IC 300. In the communication circuit, instead of the inverter I shown in FIG. 1, a flip-flop 11 is provided. The serial reception signal RXD and the serial clock signal SCK2 is input to the flip-flop 11. Further, the Y terminal of the data selector 8 is connected to the D terminal of the shift register 6 and the clock SCK2 is also connected to the clock terminal of the shift register 6. Except for these connections, the communication circuit in the second embodiment is the same as that of the communication circuit in the first embodiment in FIG. 1.

Figure 7A:
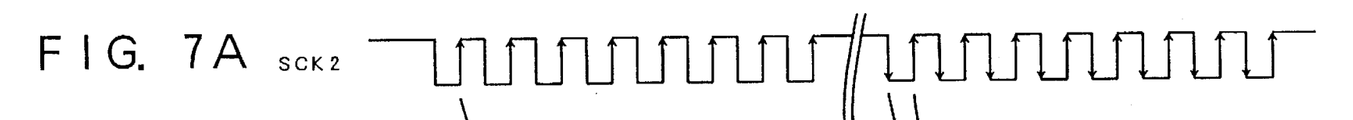
FIGS. 7A, 7B, 7C and 7D show time charts of a data receiving operation of the communication circuit shown in, FIG. 6.
Figure 7B:
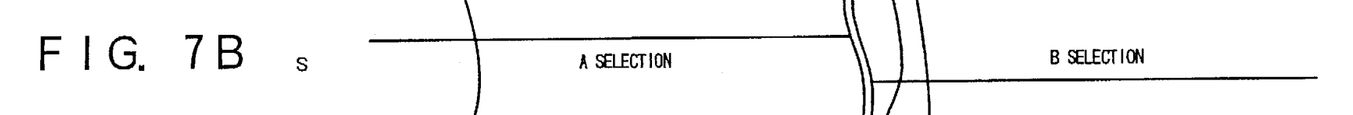
Figure 7C:
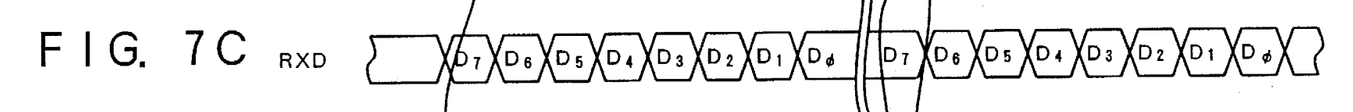
Figure 7D:
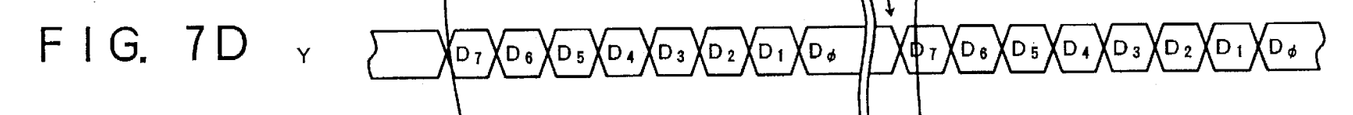
Figure 7E:
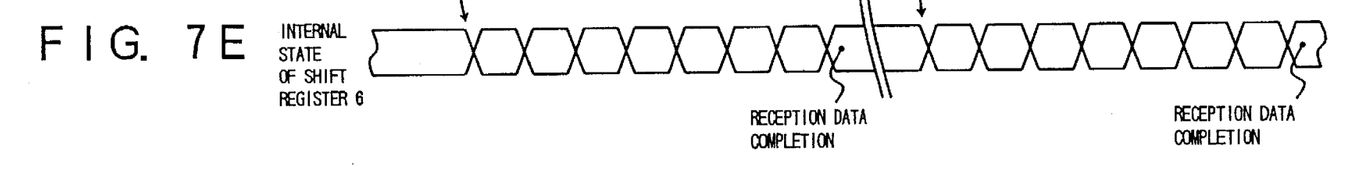
FIG. 7E shows the state of a shift register in the communication circuit shown in FIG. 6.

In the communication circuit of the second embodiment, instead of selecting one of the SCK2 and the inverted signal, whether the reception signal RXD is directly received by the shift register 6 or it is first received by the flip-flop 11 and subsequently by the shift register 6. Accordingly, when the flip-flop 11 is used as a result of the "L" level signal being supplied to the data selector 8, the reception signal RXD shown in the right half of FIG. 7C is converted into a signal shown in the right half of FIG. 7D. That is, the starting time for which the signal carries each of the 8 items of the data $D_7$–$D_\phi$ is delayed to be in synchronization with the subsequent decaying edge of the clock pulses of the serial clock signal SCK2 shown in FIG. 7A. Then, the shift register 6 takes the data of the signal shown in the right half of FIG. 7D at rising edges of the serial clock signal SCK2 as shown in the right half of FIG. 7E.

A description will now be given, in which data is transferred between the two ICs C1 and C2 as shown in FIG. 4. Each of the ICs C1 and C2 has a CPU and the communication circuit of the above-described second embodiment. In such a case, the CPU in each of the ICs C1 and C2 may determine, by transmitting the writing signal WR to the setting register 9 and thus writing data in the setting register 9, that the data selector 8 selects the reception signal RXD via the A terminal. Thus, the reception data RXD is directly received by the shift register 6 at each rising edge of the clock pulses of the serial clock signal SCK2 in a first IC, as shown in the left half of FIGS. 7A, 7B, 7C, 7D and 7E. The same data is transferred from the flip-flop 5 at each decaying edge of the clock pulses of the same serial clock signal in the second IC, as shown in FIGS. 2A, 2B, 2C and 2D. Thus, the time the shift register 6 takes data in the first IC is different, by a pulse span of the serial clock signal, from the time the flip-flop 5 transfers the same data in the second IC.

A description will now be given in which data is transferred between one IC C1 and an I/O unit 200 as shown in FIG. 5. The IC C1 has a CPU and the communication circuit of the above-described second embodiment. The serial clock signal SCK1 is also used as the serial clock signal SCK2 as shown in FIG. 5. The CPU in IC C1 may determine, by giving the writing signal WR to the setting register 9 and thus writing data in the setting register 9, that the data selector 8 and the B terminal select the output at the Q terminal of the flip-flop 11.

The reception data RXD is transmitted from the shift register 23 at each rising edge of the clock pulses of the serial clock signal in the I/O unit 200. Thus, the starting time of a time period for which the signal carries each item of the 8 items of the data $D_7$–$D_\phi$ coincides with the rising edge of the clock pulses of the serial clock signal. Then, in the signal obtained through the flip-flop 11, the starting time of the time period for which the signal carries each item of the 8 items of the data $D_7$–$D_\phi$ is delayed to be in synchronization with the subsequent decaying edge of the clock pulses of the serial clock signal SCK2 shown in the right half of FIG. 7A. Thus, the waveform shown in FIG. 7C is converted into the waveform shown FIG. 7D by the function of the flip-flop 11.

The data $D_7$–$D_\phi$ carried by the thus-obtained signal is received by the shift register 6 at the subsequent rising edge of the clock pulses of the serial clock signal in the IC C1, as shown in the right half of FIGS. 7A, 7B, 7C, 7D and 7E. Thus, the shift register 23 transfers data in the I/O unit 200 at a rising edge of the clock pulses of the serial clock signal. Then, this data transfer time is delayed to the subsequent decaying edge of the clock pulses of the serial clock signal through the flip-flop 11. The delay time is one pulse span between the rising edge and the subsequent decaying edge. Then, the shift register 6 receives data in the IC C1 at the subsequent rising edge of the clock pulses of the serial clock signal.

Thus, the time the shift register 6 takes data in the IC C1 is different, by a pulse span of the serial clock signal between the above-mentioned subsequent decaying edge and subsequent rising edge, from the time. This time is obtained as a result of delaying, through the flip-flop 11, from the time the shift register 23 transfers the same data in the I/O unit 200. As a result, the data is transferred without using any special circuitry inserted between the IC C1 and the I/O unit 200.

In above-described IC 300, which setting data is written into the setting register 9 is determined dependent on the software programs according to which the CPU operates, the software programs and changes to them being well-known in the field of communication data transfer. Therefore, it is very easy for a user to select one of two operation modes. A first operation mode is selected when the IC 300 performs data communication with an I/O unit such as the above-mentioned I/O unit 200. In order to select the first operation mode, the user is required to merely change an appropriate part of the software programs. As a result, the communication circuit is automatically set so that the flip-flop 11 is used as a result of the CPU writing appropriate setting data into the setting register 9.

A second operation mode is selected when the IC 300 performs data communication with an IC similar to that shown in FIG. 4. In order to select the second operation mode, the user is required to merely change an appropriate part of the software programs. As a result, the communication circuit is automatically set so that the flip-flop 11 is not used in response to the CPU writing appropriate setting data into the setting register 9.

Figure 8:
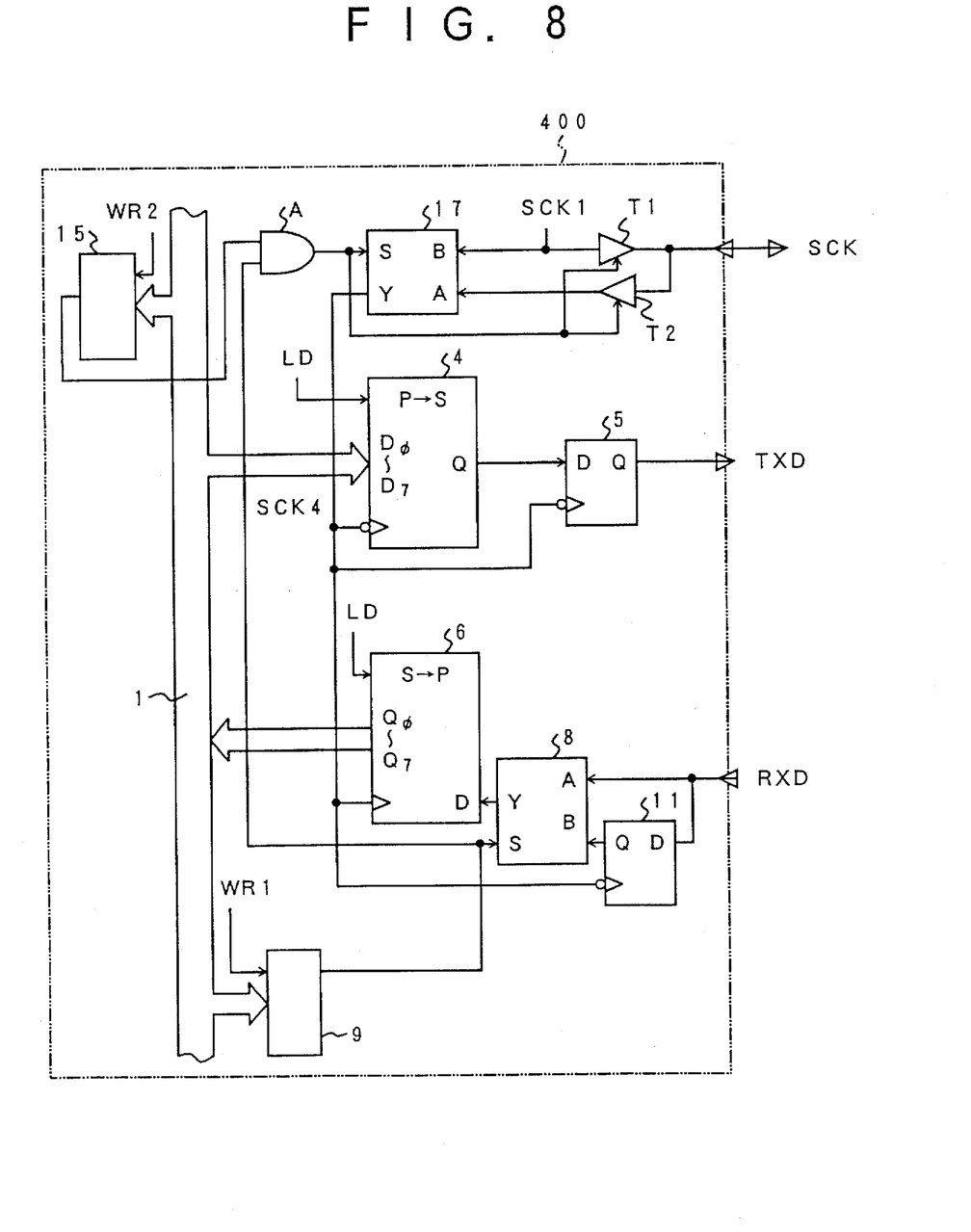
FIG. 8 shows a partial circuit diagram of an IC including a communication circuit in a third embodiment of the present invention.

With reference to FIG. 8, a communication circuit in a third embodiment of the present invention will now be described. The communication circuit in the third embodiment is included in an IC 400 which includes a CPU. In the third embodiment, the CPU outputs data writing instructions and appropriate setting data is written into a setting register 15 under control of a writing signal WR2. A signal output by the setting register 15 is input to an S terminal of a data selector 17 via an AND circuit A. The data selector 17 selects one of two signals, input via A and B terminals respectively, and outputs the selected signal via a Y terminal. Thus, the communication circuit uses a serial clock signal SCK input from the outside or the communication circuit uses the serial clock signal SCK1 which is supplied by the internal pulse generating circuit. The selected clock signal is used as a serial clock signal SCK4 in the communication circuit.

Two tri-status buffers $T_1$ and $T_2$ are provided. When an "H" level signal is input to the buffers from the AND circuit A, the buffer $T_1$ does not pass any signal therethrough and buffer $T_2$ passes a signal therethrough. Thus, the serial clock signal SCK supplied from the outside is passed through the buffer $T_2$ and input to the A terminal of the data selector 17. However, the serial clock signal SCK1 supplied by the internal pulse generating circuit is not output from the IC 400. When the "L" level signal is input to the buffers from the AND circuit A, the buffer $T_1$ passes a signal therethrough and buffer $T_2$ does not passe any signal therethrough. Thus, the serial clock signal SCK1 supplied by the internal pulse generating circuit is output from the IC 400 through the buffer $T_2$ and the serial clock signal SCK is not supplied to the data selector 17.

In the communication circuit in the third embodiment, when setting data is written into the setting register 9 by a writing signal WR1 from the CPU through the internal data bus 1, the "H" level signal is output and an "inter-CPU communication" mode is selected. This mode is a mode for transferring data between ICs, each having a CPU. If the setting data is written into the setting register 15 and thus the "H" level signal is output therefrom,det is determined that the serial clock signal SCK is used as the serial clock signal SCK4. In fact, as a result of the "H" level signals being output from the two setting registers 9 and 15, the AND circuit outputs the "H" level signal to the data selector 17 and the tri-status buffers $T_1$ and $T_2$. Thus, the tri-status buffers $T_1$ and $T_2$ pass the signal SCK to the data selector 17 and does not pass the SCK1 to the outside of the IC 400. Further, the data selector 17 selects the clock signal SCK input to the A terminal from the outside of the IC 400. Thus, the clock signal SCK is used as the clock signal SCK4.

If the setting data is written into the setting register 15 and the "L" level signal is output therefrom, it is determined that the serial clock 5 signal SCK1 is used as the serial clock signal SCK4. In this case, the serial clock signal SCK1 is also supplied to the outside. In fact, as a result of the "H" level signal being output from the setting register 9 and the "L" level signal being output from the setting register 15, the AND circuit thus outputs the "L" level signal to the data selector 17 and the tri-status buffers $T_1$ and $T_2$. Thus, the tri-status buffers $T_1$ and $T_2$ do not pass the signal SCK to the data selector 17 and pass the signal SCK1 to the outside of the IC 400. The data selector 17 selects the clock signal SCK1 input to the B terminal from the internal pulse generating circuit. Thus, the clock signal SCK1 supplied by the internal pulse generating circuit is used as the clock signal SCK4.

In the communication circuit in the third embodiment of the present invention, the clock signal SCK4 is commonly used for data transferring and data receiving and the data transferring and data receiving are performed in parallel.

Except for the above-described operations, the communication circuit in the third embodiment of the present invention is the same as that of the communication circuit in the second embodiment of the present invention.

Figure 9:
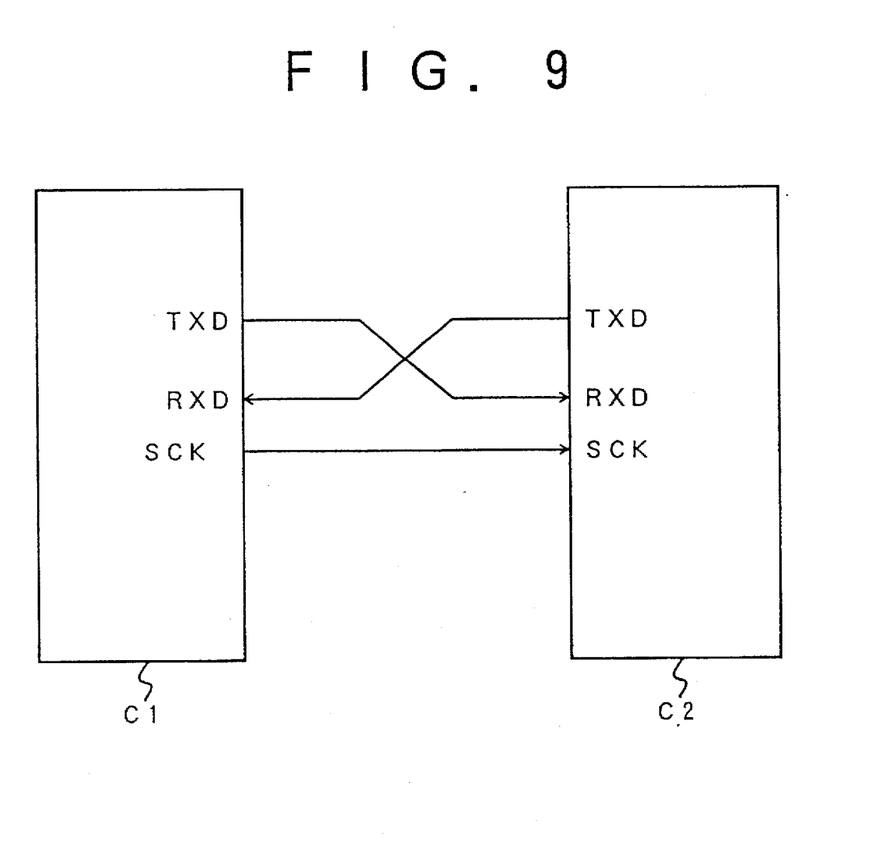
FIG. 9 shows a wire connection between two ICs, each of which includes the communication circuit in the third embodiment of the present invention.

If data is transferred between two ICs, C1 and C2 shown in FIG. 9, each being the same as the IC 400, the CPU in each of the ICs C1 and C2 sets the communication circuits into the above-mentioned "inter-CPU communication" mode.

Further, the CPU of a first IC C1 of the ICs may set the communication circuit in the first IC C1 to use the serial clock signal SCK1 in the first IC C1 as the serial clock signal SCK4 and to output the same clock signal SCK1 to the second IC C2. The CPU in the second IC C2 may accordingly set the communication circuit in the second IC C2 not to use the serial clock signal SCK1 supplied by the internal pulse generating circuit of the second IC C2 as the serial clock signal SCK4 and also to use the serial clock signal SCK1 supplied by the first IC C1. Except for these operations, operation of the communication circuit in the third embodiment is the same as that of the second embodiment of the present invention described above.

Figure 10:
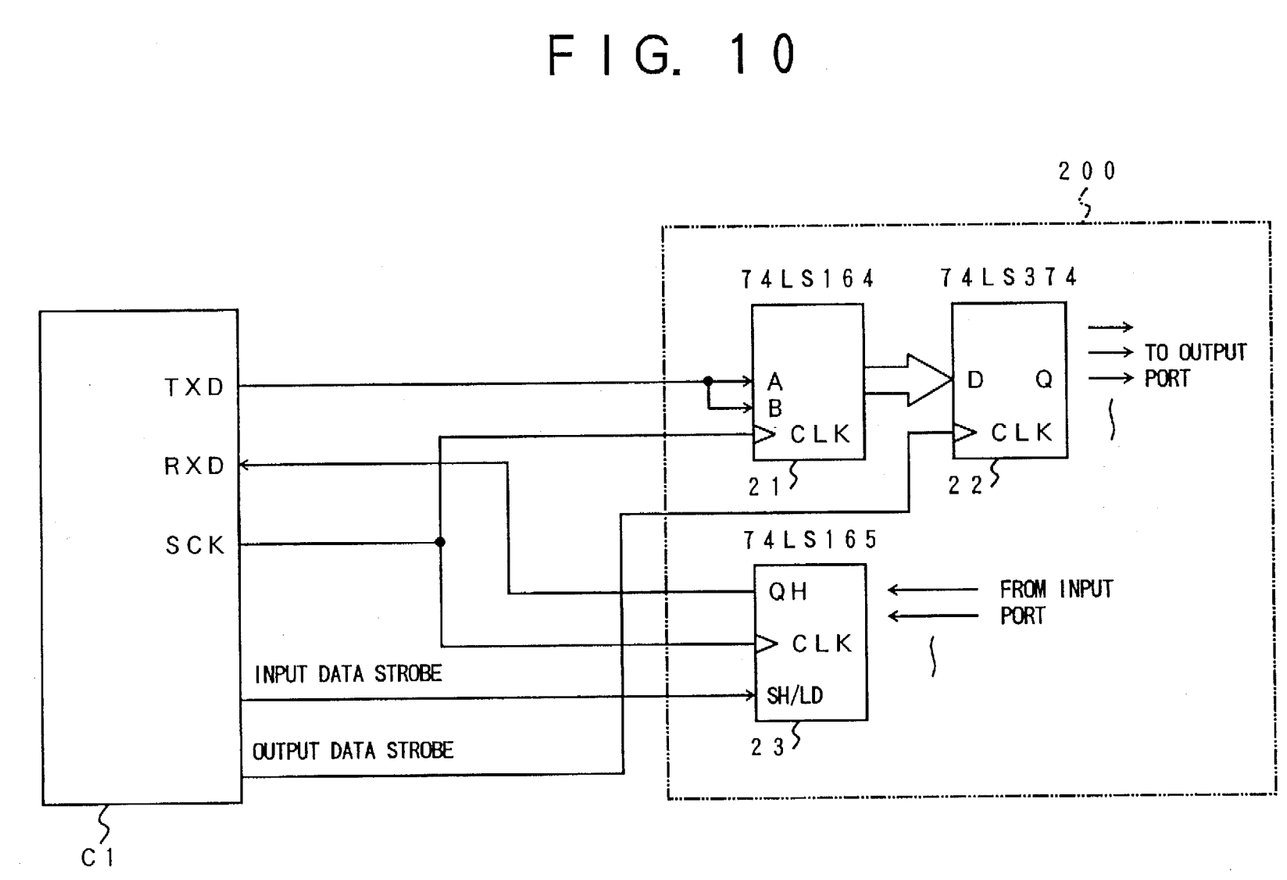
FIG. 10 shows a circuit diagram of an I/O unit in the related art and shows a wire connection between the I/O unit and an IC, which includes the communication circuit in the third embodiment of the present invention.

Operation of the communication circuit in the third embodiment of the present invention will now be described for a case where, as shown in FIG. 10, data is transferred between an IC C1 the same as the IC 400 and the I/O unit 200 the same as the I/O unit 200 shown in FIG. 5.

In this case, the setting data is written into the setting register 9 under control of the writing signal WR1 and thus the "L" level signal is output therefrom. As a result, the "L" level signal output from the setting register 9 as mentioned above is also input to the AND circuit A. Thus, independent of the level of the signal output by the other setting register 15, the AND circuit A outputs the "L" level signal to the shift register 17 at the S terminal. Thus, the tri-status buffers $T_1$ and $T_2$ do not pass the signal SCK to the data selector 17 and pass the signal SCK1 to the I/O unit 200. Further, the data selector 17 selects the clock signal SCK1 input to the B terminal from the internal pulse generating circuit. Thus, the clock signal SCK1 is used as the clock signal SCK4.

Further, similarly to the operation of the communication circuit in the second embodiment of the present invention, the data selector 8 selects the reception signal RXD through the flip-flop 11. Thus, the time difference of one pulse span is created between the time delayed for one pulse span through the flip-flop 11 from the time the shift register 23 transfers one item of data in the signal, and the time the shift register 6 takes the same item of data in the same signal. As a result, the data can be surely transferred without using any special circuits inserted between the IC C1 and the I/O unit 200.

The other operations of the communication circuit in the third embodiment of the present invention are the same as those in the second embodiment.

In the above-described IC 400, the setting data is written into the setting register 9 and is under control of the writing signal WR1. Thus, it is determined whether the "H" level signal or the "L" level signal is output from the setting register 9 dependent on appropriate software programs which operate the CPU, the software programs and changes to them being well-known in the field of communication data transfer. Further, the setting data is written into the setting register 15 and is under control of the writing signal WR2. Thus, it is determined whether the "H" level signal or the "L" level signal is output from the setting register 15 dependent on the software programs which operate the CPU operates, the software programs and changes to them being well-known in the field of communication data transfer.

Therefore, it is very easy for a user to select one operation mode from among a first operation mode, a second operation mode and a third operation mode. The above-described selection can be done merely by change an appropriate part of the software programs. As a result of the software program change, the CPU automatically writes appropriate setting data into the setting registers 9 and 15.

The first operation mode is selected when the IC 400 performs data communication with an I/O unit such as the I/O unit 200. If the first operation mode is selected as a result of the above-mentioned software program change by the user, the following selecting operation is automatically performed: The communication circuit is set through the setting register 9 so that the flip-flop 11 is used. Further, through the setting registers 9 and 15, the serial clock signal SCK1 generated by the internal generating circuit is used as the serial clock signal SCK4 in the IC 400 and also the same signal SCK1 is supplied outside of the IC 400.

The second operation mode is selected when the IC 400 performs data communication with a similar IC as shown in FIG. 9 and also the serial clock signal SCK1 generated by the internal generating circuit is used as the serial clock signal SCK4 and the signal SCK1 is supplied outside of the IC 400. If the second operation mode is selected as a result of the software program change by the user, the following selecting operation is automatically performed: The communication circuit is set through the setting register 9 so that the flip-flop 11 is not used. Thus, through the setting registers 9 and 15, the serial clock signal SCK1 is used as the serial clock signal SCK4 and also the same signal SCK1 is supplied outside of the IC 400.

The third operation mode is selected when the IC 400 performs data communication with a similar IC as shown in FIG. 9 and also the serial clock signal SCK supplied by the above-mentioned similar IC is used as the serial clock signal SCK4 in the IC 400. If the third operation mode is selected as a result of the software program change by the user, the following selecting operation is automatically performed: The communication circuit is set through the setting register 9 so that the flip-flop 11 is not used. Further, through the setting registers 9 and 15, the serial clock signal SCK supplied by the IC is used as the serial clock signal SCK4 in the IC 400.

Thus, in the above-mentioned embodiments of the present invention, it is possible to perform data transfer in a serial data form using a relatively simple circuit construction even between an IC including a CPU and an I/O unit. Thus, reliable data transfer in which noise contamination is eliminated can be achieved.

Further, in the third embodiment, data transferring and receiving can be performed in parallel using a common serial clock signal. Thus, the efficiency of data communication can be improved.

The present invention is not limited to the above-described embodiments, and variations and modifications may be made without departing from the scope of the present invention.

What is claimed is:

1. A communication circuit that is controllably configured to receive a received signal from a first signal source when in a first operational mode and from a second signal source when in a second operational mode, comprising:

data receiving means for receiving data items from the received signal, said received signal being in synchronization with a rising edge of a timing signal when in said first operational mode and being in synchronization with a decaying edge of the timing signal When in the second operational mode; and changeover means for changing via a software operation between the first operational mode when said received signal is received from the first signal source and the second operational mode when the received signal is received from the second operational source.

2. The communication circuit according to claim 1, wherein:

said received signal transmits said data items therein so that said data items are successively transmitted and each item of said data items is maintained for a predetermined time period; and said changeover means provides a different time by delaying for another time period within said predetermined time period.

3. The communication circuit according to claim 2, wherein:

said timing signal comprises a clock signal having serial clock pulses, said predetermined time period being a time between two adjacent same sort of edges of said serial clock pulses;

said data receiving means for receiving respective of said data items from said received signal at a same sort of edge of said serial clock pulses; and said changeover means including an inverter for inverting said clock signal between a high level and a low level.

4. The communication circuit according to claim 2, wherein:

said timing signal comprises a clock signal providing serial clock pulses, said predetermined time period being a time between two adjacent same sort of edges of said serial clock pulses;

said data receiving means for receiving respective of said data items from said received signal at a same sort of edge of said serial clock pulses; and said changeover means comprises signal delaying means for delaying said receiving signal for a predetermined delay time.

5. The communication circuit according to claim 4, wherein said predetermined delay time comprises a time period between a first sort of edge of said serial clock pulses and a subsequent different sort of edge of said serial clock pulses.

6. The communication circuit according to claim 1, further comprising data putting means for putting said data items onto a transmitting signal at a time according to one of said timing signal or another timing signal.

7. The communication circuit according to claim 1, further comprising selecting means for selecting whether said changeover means is used for providing a different time at which said data receiving means receives said items of data according to whether another communication circuit to which said communication circuit connects uses said first operational mode or said second operational mode.

8. An integrated circuit comprising:

a central processing unit that performs predetermined processing;

a communication circuit that provides data communication between said central processing unit and another communication circuit that is external to said integrated circuit, comprising, data receiving means for receiving data items from a received signal at either a time according to a given timing signal or at a different time, said given timing signal being directly received by said data receiving means from another communication circuit; and time differing means for providing said different time to said data receiving means so that said data receiving means is configured to receive said data items when said another communication circuit uses a same timing convention or a different timing convention than said data receiving means.

9. The communication circuit according to claim 8, further comprising selecting means for selecting whether said time differing means is used according to whether said another communication circuit uses said same timing convention or said different timing convention.

10. The integrated circuit according to claim 9, wherein said selecting means is for automatically selecting whether said time differing means is used by changing a software program.

11. The integrated circuit according to claim 8, wherein said communication circuit further comprises selecting means for selecting said given timing signal from one of a source external to said integrated circuit and an internal pulse generating circuit included in said integrated circuit.

12. The integrated circuit according to claim 11, wherein said selecting means is for automatically selecting whether said time differing means is used by changing a software program.

13. A communication circuit that is controllably configured to receive a received signal from a first signal source when in a first operational mode and from a second signal source when in a second operational mode, comprising:

a timing signal input port that receives a timing signal having a falling edge and a decaying edge;

a received signal input port that receives a received signal;

a data selector circuit having,
an input configured to receive said timing signal from said timing signal input port,
a control signal input port, and
an output port that outputs as an output clock signal a first clock signal when in said first operational mode and a second clock signal when in the second operational mode; and a software controllable control circuit configured to send a control signal to said control signal port of said data selector circuit, said control signal indicating a selection of either the first clock signal or the second clock signal so that said received signal is received in synchronization with a rising edge of said output clock signal when received from said first signal source and said received signal being in synchronization with a decaying edge of said output clock signal when received from said second signal source.

14. The circuit of claim 13, wherein said software controllable control circuit comprises a central processing unit connected to a data register, said central processing unit being configured to set a first data value in said data register when operating in said first operational mode and configured to set a second data value in said data register when operating in said second operational mode.

15. The circuit of claim 13, further comprising a serial to parallel converter configured to receive said received signal as a serial bit stream and output a parallel data word, said serial to parallel converter receiving data items in said received signal in synchronization with said output clock signal.

16. The circuit of claim 13, wherein said data selector comprises another input port and an inverter, said inverter being configured to invert a logic value of said timing signal so as to produce an inverted timing signal and apply said inverted timing signal to said another input port of said data selector.

17. The circuit of claim 13, further comprising an integrated circuit, said integrated circuit comprising said data selector circuit and said software controllable control circuit.

18. A communication circuit that is controllably configured to receive a received signal from a first signal source when in a first operational mode and from a second signal source when in a second operational mode, comprising:

a timing signal input port that receives a timing signal having a falling edge and a decaying edge;

a received signal input port that receives a received signal;

a data selector circuit having,
a first input configured to receive said received signal from said received signal input port,
a second input configured to receive said received signal after being delayed by a predetermined time,
a control signal input, and
an output port that outputs said received signal when in said first operational mode and outputs said received signal after being delayed when in the second operational mode; and a software controllable control circuit that sends a control signal to said control signal port of said data selector circuit, said control signal selecting one of the received signal and the received signal after being delayed so that said received signal is received in synchronization with the rising edge of said timing signal when received from said first signal source and said received signal being in synchronization with the decaying edge of said timing signal when received from said second signal source.

19. The communications circuit of claim 18, further comprising:

a bidirectional timing signal port controllably configured to receive an external timing signal as said timing signal and output an internally generated timing signal for establishing another timing signal for use by a second communications circuit connected thereto; and a clock control signal configured to select the timing signal from between said external timing signal and said internally generated timing signal.

* * * * *